United States Patent
Tsai

(10) Patent No.: US 7,447,308 B2
(45) Date of Patent: Nov. 4, 2008

(54) LOW-NOISE TRANSMITTING RECEIVING EARSET

(76) Inventor: Jin-Chou Tsai, 18/F, No. 95, Roosevelt Rd., Sec. 2, Taipei City (TW)

( * ) Notice: Subject to any disclaimer, the term of this patent is extended or adjusted under 35 U.S.C. 154(b) by 683 days.

(21) Appl. No.: 11/211,671

(22) Filed: Aug. 26, 2005

(65) Prior Publication Data

US 2007/0047739 A1    Mar. 1, 2007

(51) Int. Cl.
- H04M 9/00 (2006.01)
- H04M 1/00 (2006.01)
- H04R 25/00 (2006.01)
- A61F 11/06 (2006.01)
- G10K 11/16 (2006.01)

(52) U.S. Cl. .................. 379/430; 381/71.6; 381/380
(58) Field of Classification Search ............ 379/430; 381/71.6, 380, 349
See application file for complete search history.

(56) References Cited

U.S. PATENT DOCUMENTS

| 5,182,774 | A  | * | 1/1993 | Bourk ................... 381/71.6 |
| 6,415,034 | B1 | * | 7/2002 | Hietanen ................ 381/71.6 |
| 7,362,876 | B2 | * | 4/2008 | Tsai ..................... 381/380 |
| 2008/0037801 | A1 | * | 2/2008 | Alves et al. ............ 381/71.6 |

* cited by examiner

*Primary Examiner*—Curtis Kuntz
*Assistant Examiner*—Phylesha Dabney
(74) *Attorney, Agent, or Firm*—Rosenberg, Klein & Lee

(57) ABSTRACT

A low-noise transmitting receiving earset includes a housing covered with a grille, a speaker mounted inside the housing adjacent to the grille and facing the back side of the housing, a first microphone mounted in the hub of the grille and facing the front side of the housing for picking up resonant sound waves from the external auditory canal of the user's ear, and a second microphone mounted inside the housing remote from the speaker for receiving voices directly from the user's mouth.

4 Claims, 5 Drawing Sheets

LOW-NOISE TRANSMITTING RECEIVING EARSET

BACKGROUND OF THE INVENTION

1. Field of the Invention

The present invention relates to a transmitting receiving earset and more particularly, to a low-noise transmitting receiving earset 2. Description of the Related Art FIG. 5 shows a conventional transmitting receiving earset 3 for use with a cellular telephone 33. According to this design, the transmitting receiving earset 3 comprises a speaker 31 and a microphone 32. According to this design, the microphone 32 is kept at a distance away from the speaker 31. During communication, the microphone 32 picks up the user's voice and the surrounding noises, lowering the communication quality.

FIG. 6 shows an earset for wireless communication according to the prior art. According to this design, the earset 4 comprises an elongated housing 41, a speaker 42 installed in one end of the housing 41, a microphone 43 installed in the other end of the housing 41, and an ear hook 44 connected to the housing 41 for securing the housing 41 to the user's ear. This design of earset 4 cannot eliminate interference of external noises.

FIG. 7 shows an earset constructed according to U.S. Ser. No. 10/949,308, which was invented by the present inventor. According to this design, the earset comprises a housing 5, a front grille 52 covered on the front open side of the housing 5, a speaker 51 mounted in the housing 5 behind the grille 52, and a microphone 54 mounted in inside space 53 of the grille 52 in front of the speaker 51. This design of earset is functional, however because the speaker 51 and the microphone 53 are set in the same enclosed cavity, the sound produced by the speaker may be received by the microphone 54, resulting in an echo problem. In order to eliminate the problem of echo, the sensitivity of the microphone 54 may be lowered. However, lowering the sensitivity of the microphone 54 affects the performance of the earset, and the party at the remote side may be unable to hear the voice of the user of this earset.

SUMMARY OF THE INVENTION

The present invention has been accomplished under the circumstances in view. It is the main object of the present invention to provide a low-noise transmitting receiving earset, which prevents interference of external noises and eliminates possible echo during operation. To achieve this and other objects of the present invention, the low-noise transmitting receiving earset comprises a housing, the housing having a grille covered on a front side thereof, the grille having a hub at the center thereof and a plurality of through holes spaced around the hub, the hub defining therein a receiving space and an axial center through hole in communication with the receiving space; a speaker mounted in the housing behind said grille; a first microphone mounted inside the receiving space of the hub the grille in front of the speaker and aimed at the axial center through hole of the hub for picking up resonant sound waves from the external auditory canal of the user's ear; and a second microphone mounted inside the housing remote from the speaker for picking up voices from the user's mouth.

DETAILED DESCRIPTION OF THE PREFERRED EMBODIMENT

Figure 1:
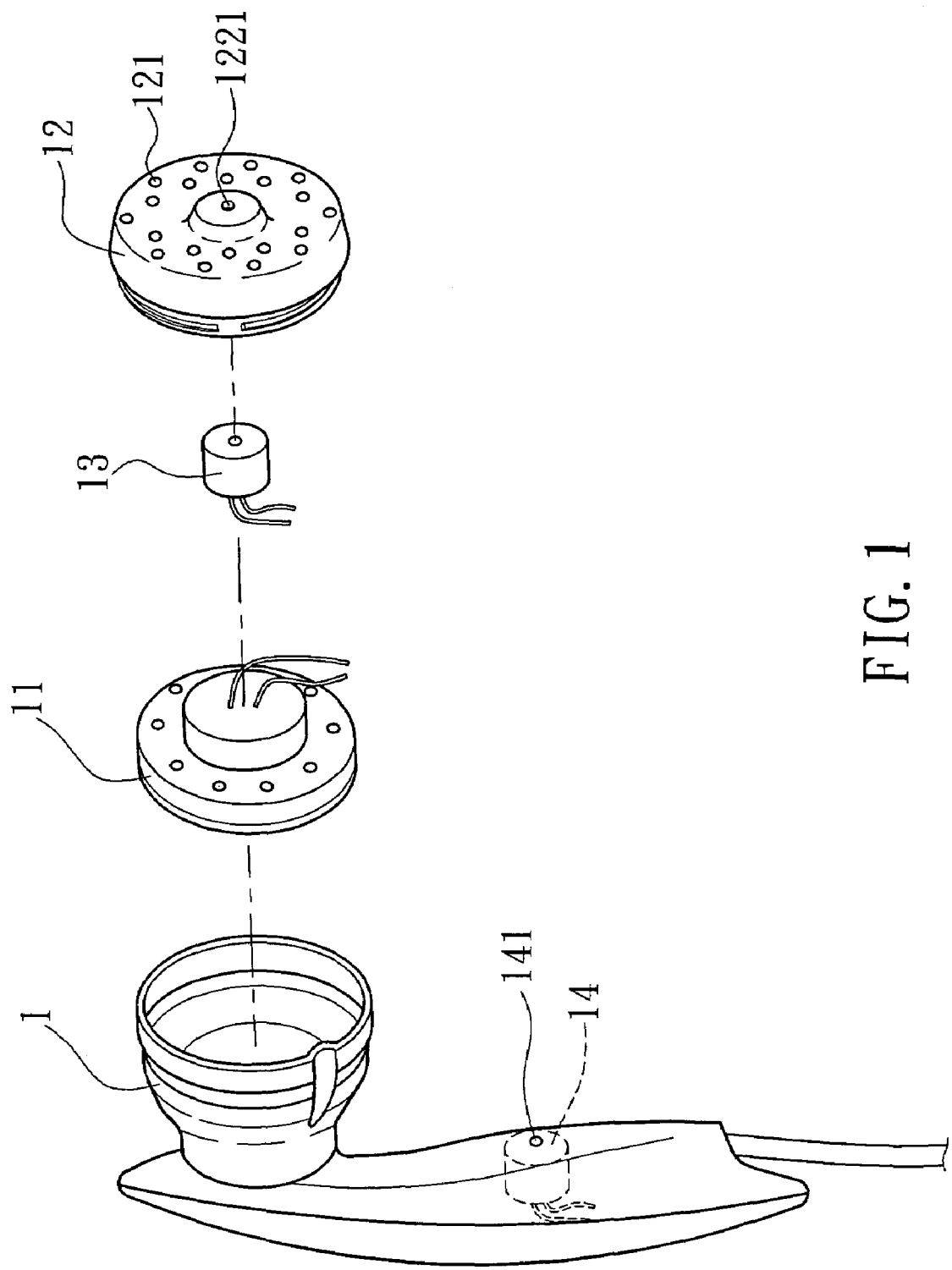
FIG. 1 is an exploded view of a low-noise transmitting receiving earset according to the present invention.
Figure 2:
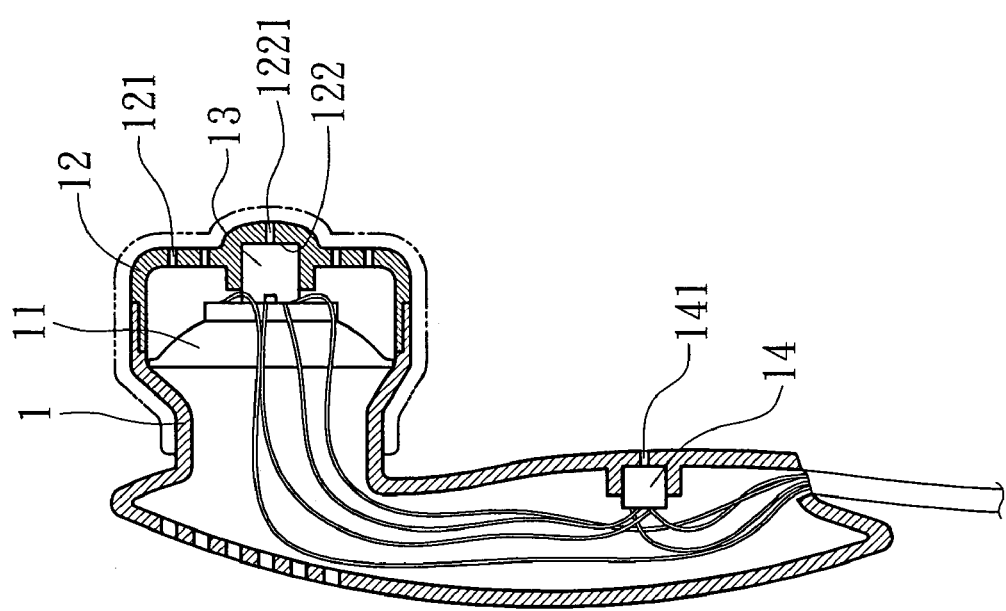
FIG. 2 is a sectional assembly view of the low-noise transmitting receiving earset according to the present invention.
Figure 3:
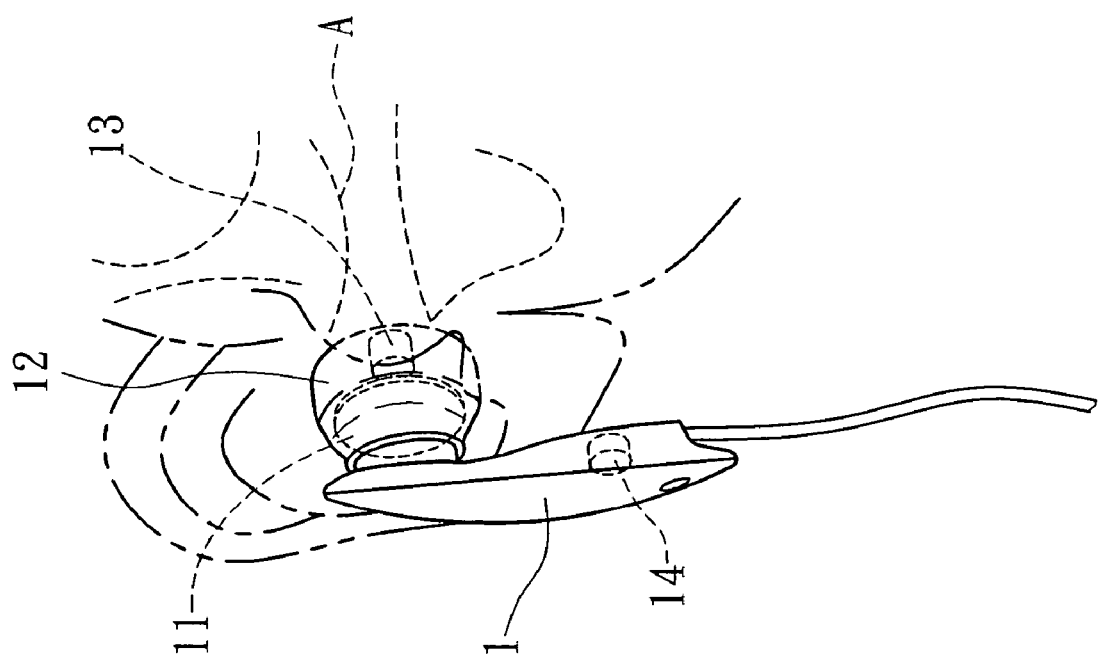
FIG. 3 is a schematic drawing showing a use of the low-noise transmitting receiving earset according to the present invention.
Figure 5:
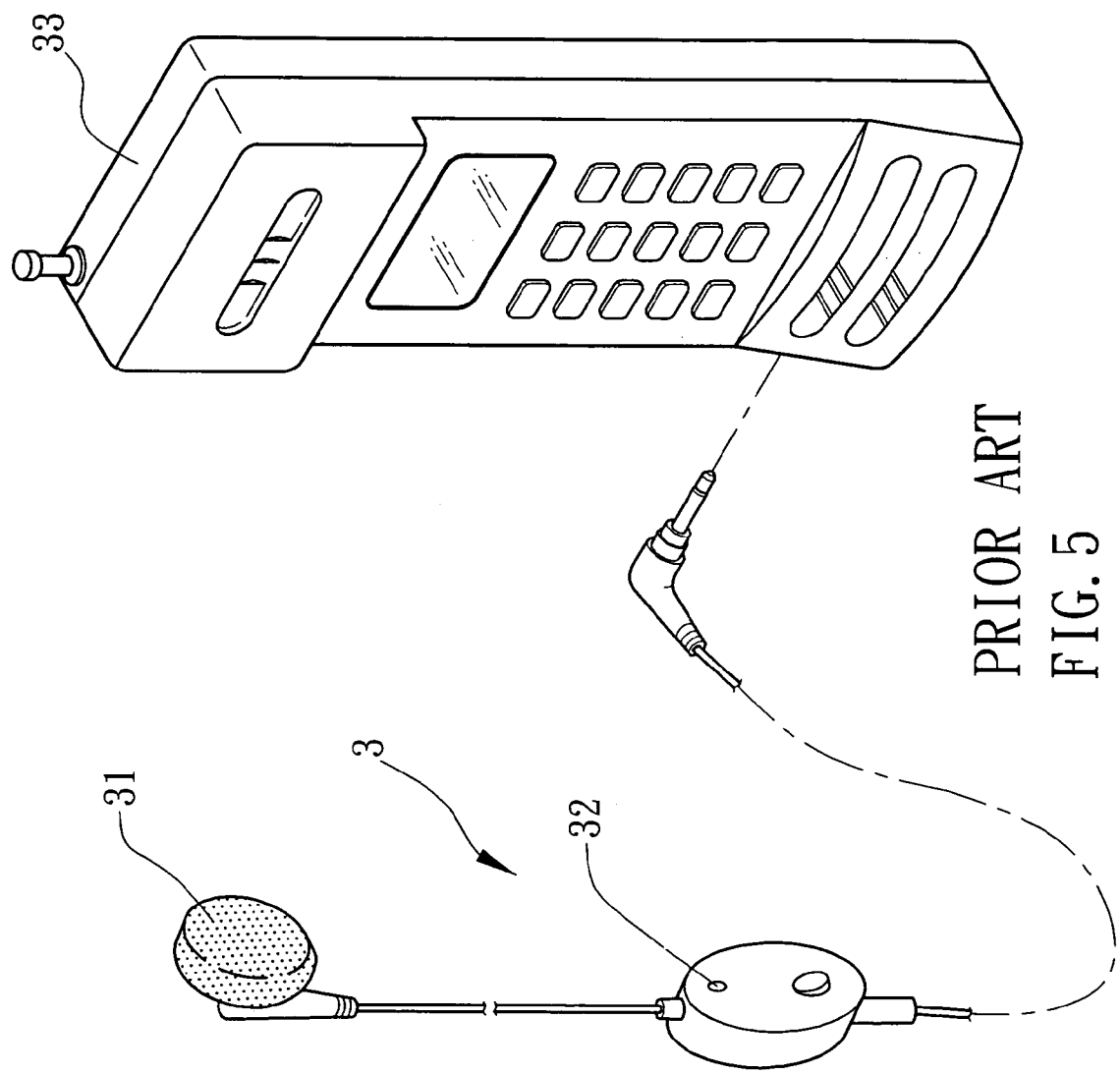
FIG. 5 shows a conventional transmitting receiving earset for use with a cellular telephone.
Figure 7:
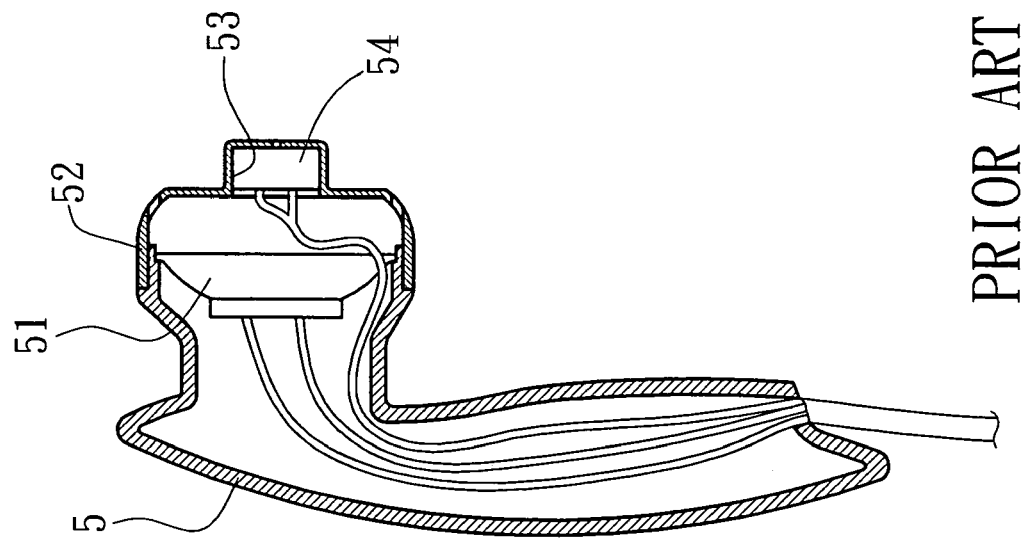
FIG. 7 shows an earset constructed according to U.S. Ser. No. 10/949,308.
Figure 6:
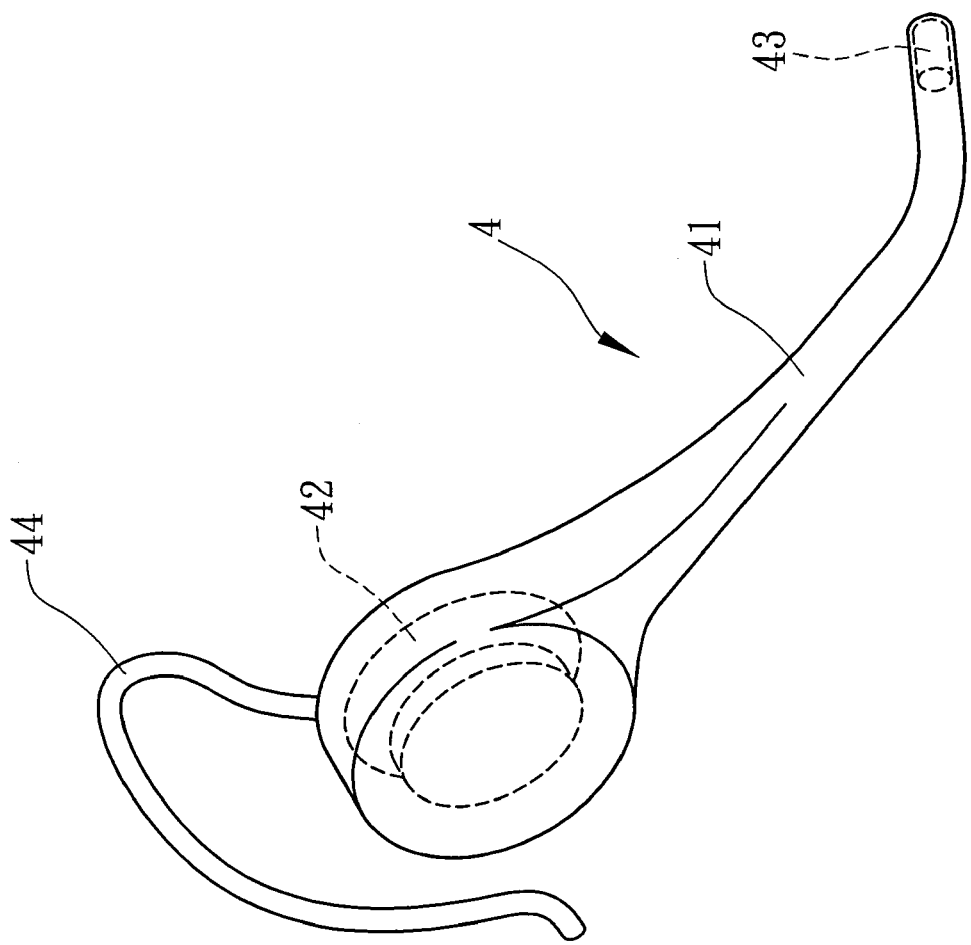
FIG. 6 shows an earset for wireless communication according to the prior art.

Referring to FIGS. 1, 2 and 3, a low-noise transmitting receiving earset in accordance with the present invention is shown comprising a housing 1, a speaker 11 mounted in the housing 1, a grille 12, which is fastened to the housing 1 and covered over the speaker 11 and, which has a hub 122 at the center and a plurality of through holes 121 spaced around the center tube 122, a first microphone 13 mounted in the hub 122 of the grille 12 in line with the axial center through hole 1221 of the hub 122 of the grille 12, and a second microphone 14 mounted inside the housing 1 remote from the speaker 11. The second microphone 14 has a receiving hole 141 lying open to the outside for receiving sound. Further, the speaker 11 extends in direction reversed to the extending direction of the first microphone 13, i.e., the speaker 11 faces the back side of the housing 1.

Referring to FIG. 3, when the user inserted the earset into the external auditory canal A of the ear, the first microphone 13 is held inside the external auditory canal A, and the second microphone 14 is disposed outside the user's ear. During communication, the microphone 13 picks up resonant sound waves from the external auditory canal A and at the same time, the second microphone 14 directly picks up the voices from the user's mouth. In order to prevent the production of an eco and to prohibit the first microphone 13 from receiving much voice from the speaker 11, the first microphone 13 has a relatively lower sensitivity than the second microphone 14. By means of setting the first microphone 13 inside the user's external auditory canal A to pick up resonant sound waves from the external auditory canal A and holding the second microphone 14 outside the user's ear to directly pick up the voices from the user's mouth, the user's voices are combined for transmission to a wired external apparatus, or to a remote communication apparatus through wireless communication techniques. Further, the sensitivity of the second microphone 14 is higher than the first microphone 13, however it is slightly lower than conventional commercial microphones for this purpose so that the second microphone 14 does not receive much external noise when picking up the user's voices.

Figure 4:
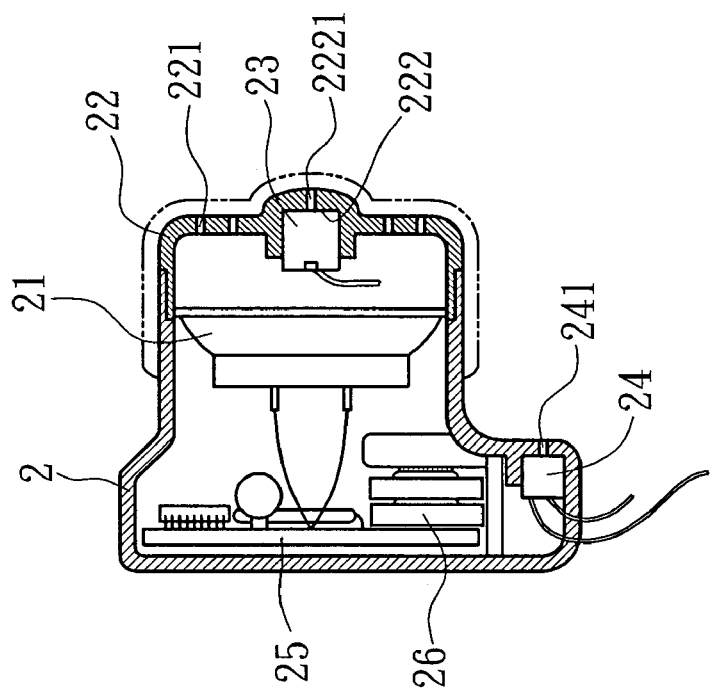
FIG. 4 is a sectional view of an alternate form of the present invention.

FIG. 4 shows an alternate form of the present invention. According to this embodiment, the low-noise transmitting receiving earset comprises a housing 2, a speaker 21 mounted in the housing 2, a grille 22, which is fastened to the housing 2 and covered over the speaker 21 and, which has a hub 222 at the center and a plurality of through holes 221 spaced around the center hub 222, a first microphone 23 mounted in the hub 222 of the grille 22 in line with the axial center through hole 2221 of the hub 222 of the grille 22, a second microphone 24 mounted inside the housing 2 remote from the speaker 21 and a receiving hole 241 lying open to the outside for receiving sound, a wireless transmitting receiving circuit 25 mounted inside the housing 2 at the back side and electrically connected with the speaker 21 and the microphones 23 and 24, and a battery 26 mounted inside the housing 2 and electrically connected to the wireless transmitting receiving circuit 25 for providing the necessary working voltage to the wireless transmitting receiving circuit 25, the speaker 21, the first microphone 23 and the second microphone 24. The second microphone 24 has a receiving hole 241 lays open to the outside of the housing 2 for receiving voices directly from the user's mouth. Further, the sensitivity of the first microphone 23 is relatively lower than the second microphone 24. This embodiment achieves the same effects as the embodiment shown in FIGS. 1~3.

A prototype of low-noise transmitting receiving earset has been constructed with the features of FIGS. 1~4. The low-noise transmitting receiving earset functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A low-noise transmitting receiving earset comprising:
   a housing, said housing having a front side, a rear side, a grille covered on said front side, said grille having a hub at the center thereof and a plurality of through holes spaced around said hub, said hub defining therein a receiving space and an axial center through hole in communication with said receiving space;
   a speaker mounted in said housing behind said grille and facing the back side of said housing;
   a first microphone mounted inside said receiving space of said hub of said grille in front of said speaker and facing the front side of said housing and aimed at the axial center through hole of said hub for picking up resonant sound waves from the external auditory canal of the user's ear; and
   a second microphone mounted inside said housing remote from said speaker for picking up voices from the user's mouth.

2. The low-noise transmitting receiving earset as claimed in claim 1, wherein said second microphone has a receiving side laying open to the outside of said housing.

3. A low-noise transmitting receiving earset comprising
   a housing, said housing having a front side, a rear side, a grille covered on said front side, said grille having a hub at the center thereof and a plurality of through holes spaced around said hub, said hub defining therein a receiving space and an axial center through hole in communication with said receiving space;
   a speaker mounted in said housing behind said grille and facing the back side of said housing;
   a first microphone mounted inside said receiving space of said hub of said grille in front of said speaker and facing the front side of said housing and aimed at the axial center through hole of said hub for picking up resonant sound waves from the external auditory canal of the user's ear;
   a second microphone mounted inside said housing remote from said speaker for picking up voices from the user's mouth;
   a wireless transmitting receiving circuit mounted inside said housing and electrically connected with said speaker, said first microphone and said second microphone; and
   a battery mounted inside said housing and adapted to provide the necessary working power to said wireless transmitting receiving circuit, said speaker, said first microphone and said second microphone.

4. The low-noise transmitting receiving earset as claimed in claim 2, wherein said second microphone has a receiving side lying open to the outside of said housing.

\* \* \* \* \*